United States Patent
Brayton et al.

(10) Patent No.: US 10,796,256 B2
(45) Date of Patent: Oct. 6, 2020

(54) PROCESS VALIDATION AND ELECTRONIC SUPERVISION SYSTEM

(71) Applicant: Paragon Health

(72) Inventors: Larry Joe Brayton, Southlake, TX (US); Eric Ho, Dallas, TX (US); Ananthalakshmi Padmanabhan, Allen, TX (US)

(73) Assignee: Paragon Health, Dallas, TX (US)

( * ) Notice: Subject to any disclaimer, the term of this patent is extended or adjusted under 35 U.S.C. 154(b) by 767 days.

(21) Appl. No.: 14/986,651

(22) Filed: Jan. 1, 2016

(65) Prior Publication Data

US 2016/0335570 A1    Nov. 17, 2016

Related U.S. Application Data

(60) Provisional application No. 62/099,437, filed on Jan. 2, 2015.

(51) Int. Cl.
  *G06Q 10/06* (2012.01)
(52) U.S. Cl.
  CPC ... *G06Q 10/0633* (2013.01); *G06Q 10/06395* (2013.01)
(58) Field of Classification Search
  CPC .......... G06Q 10/0633; G06Q 10/0635; G06Q 10/0639; G06Q 10/08355; G06Q 10/0835; G06Q 10/087; G06Q 20/4016; G05B 2219/32196; G07D 11/0075
  See application file for complete search history.

(56) References Cited

U.S. PATENT DOCUMENTS

| 4,653,010 | A | * | 3/1987 | Figler | A61J 3/002 222/134 |
| 5,511,594 | A | * | 4/1996 | Brennan | A61J 3/00 141/100 |
| 6,202,923 | B1 | * | 3/2001 | Boyer | G06Q 10/10 235/375 |
| 7,194,336 | B2 | | 3/2007 | DiGianfilippo et al. | |
| 8,332,237 | B2 | * | 12/2012 | Greenman | G06F 19/3456 705/2 |

(Continued)

FOREIGN PATENT DOCUMENTS

WO    9850840 A2    11/1998

OTHER PUBLICATIONS

"Impact of pharmacist interventions on patients' adherence to antidepressants and patient-reported oucomes: a systematic review," by Khalaf Ali Al-Jumah, et al., published by Dovepress in Patient Preference and Adherence journal, 2012.*

*Primary Examiner* — Tyler W Knox
(74) *Attorney, Agent, or Firm* — Excellere IP International; Anne Burkhart

(57) ABSTRACT

An integrated platform implementing system-driven process standardization in the sterile compounding, home infusion, and alternate-site infusion pharmacy practice settings is set forth. The system employs portable electronics combinable with clinical databases and desktop computers, if desired, with each step of the compounding process for real-time delivery of a pharmacy's sterile product operations from order capture to delivery of order. Real-time review of the captures is available through the process and the product's compounding process can be attached to a patient's record.

13 Claims, 4 Drawing Sheets

(56) References Cited

U.S. PATENT DOCUMENTS

| | | | | |
|---|---|---|---|---|
| 8,756,124 B1* | 6/2014 | Sayers, III | G16H 40/20 | 705/28 |
| 8,775,198 B2* | 7/2014 | Wiener | G06Q 50/22 | 705/2 |
| 8,805,578 B2* | 8/2014 | Chudy | G06F 19/3462 | 700/241 |
| 8,972,050 B2* | 3/2015 | Johnson | G07F 9/002 | 700/241 |
| 9,272,796 B1* | 3/2016 | Chudy | B65B 5/103 | |
| 9,633,172 B2* | 4/2017 | Overfield | G07F 9/002 | |
| 10,181,186 B2* | 1/2019 | Kriheli | G06K 9/18 | |
| 2001/0044731 A1* | 11/2001 | Coffman | G16H 20/13 | 705/3 |
| 2001/0056359 A1* | 12/2001 | Abreu | G06Q 50/24 | 705/3 |
| 2002/0100762 A1* | 8/2002 | Liff | G06F 19/3462 | 221/1 |
| 2003/0060926 A1* | 3/2003 | Yuyama | G06Q 50/22 | 700/237 |
| 2003/0139945 A1* | 7/2003 | Brown | G06Q 10/10 | 705/2 |
| 2003/0158508 A1* | 8/2003 | DiGianfilippo | G16H 20/10 | 604/4.01 |
| 2004/0087888 A1* | 5/2004 | DiGianfilippo | G06F 19/3456 | 604/19 |
| 2004/0138921 A1* | 7/2004 | Broussard | G06Q 10/10 | 705/2 |
| 2004/0260593 A1* | 12/2004 | Abraham-Fuchs | G06Q 10/06398 | 705/7.26 |
| 2005/0021413 A1* | 1/2005 | Berry | G06Q 50/22 | 206/459.1 |
| 2005/0086008 A1* | 4/2005 | DiGianfilippo | G06F 19/00 | 702/19 |
| 2005/0240305 A1* | 10/2005 | Bogash | G07F 9/002 | 700/242 |
| 2006/0036407 A1* | 2/2006 | Smith | G06F 19/00 | 702/188 |
| 2006/0259195 A1* | 11/2006 | Eliuk | B65B 31/02 | 700/245 |
| 2007/0255595 A1* | 11/2007 | Nickell | G16H 20/13 | 705/2 |
| 2008/0059228 A1* | 3/2008 | Bossi | G06F 19/3418 | 705/2 |
| 2009/0192819 A1* | 7/2009 | Zimmermann | G06Q 10/087 | 705/2 |
| 2009/0281835 A1* | 11/2009 | Patwardhan | G16H 40/63 | 705/3 |
| 2009/0313046 A1* | 12/2009 | Badgett | G06Q 50/24 | 705/3 |
| 2010/0015184 A1* | 1/2010 | Tuel | G06Q 50/04 | 424/400 |
| 2010/0094653 A1* | 4/2010 | Tribble | G16H 20/10 | 705/3 |
| 2010/0241270 A1* | 9/2010 | Eliuk | B01F 13/1072 | 700/216 |
| 2010/0256816 A1* | 10/2010 | Popp | G05B 23/0224 | 700/268 |
| 2011/0131056 A1* | 6/2011 | Chudy | G06Q 50/22 | 705/2 |
| 2011/0166878 A1* | 7/2011 | Louie | G06Q 50/22 | 705/2 |
| 2011/0245967 A1* | 10/2011 | Shah | G07F 7/00 | 700/236 |
| 2011/0267465 A1* | 11/2011 | Alexander | A61B 90/96 | 348/143 |
| 2012/0278096 A1* | 11/2012 | Holness | G06Q 10/08 | 705/2 |
| 2013/0018356 A1* | 1/2013 | Prince | G06Q 10/0833 | 604/506 |
| 2013/0317753 A1* | 11/2013 | Kamen | G16H 40/20 | 702/19 |
| 2014/0214436 A1* | 7/2014 | Utech | G06F 19/3462 | 705/2 |
| 2014/0222464 A1* | 8/2014 | Sharaf | G06F 19/328 | 705/3 |
| 2014/0316796 A1* | 10/2014 | Cox | G06F 19/3456 | 705/2 |
| 2014/0316797 A1* | 10/2014 | Biernacki | G16H 50/30 | 705/2 |
| 2014/0350946 A1* | 11/2014 | Klomp | G06Q 50/22 | 705/2 |
| 2015/0019138 A1* | 1/2015 | Kaucky | G06F 19/3456 | 702/19 |
| 2015/0234991 A1* | 8/2015 | Pinsonneault | G16H 40/20 | 705/3 |
| 2016/0045876 A1* | 2/2016 | Kaucky | B01F 13/1066 | 366/162.1 |
| 2016/0103978 A1* | 4/2016 | Stong | G06F 19/3481 | 705/3 |
| 2016/0196408 A1* | 7/2016 | Bessette | G06F 19/328 | 705/3 |

* cited by examiner

FIG. 2

| Ready Time | Rx # | Patient Name | Drug | Current Stage | Progress |
|---|---|---|---|---|---|
| 1954 | 121021 | | Milrinone 400 mcg/mL - 735 mL *4 Day | Staging | |
| 1955 | 126963 | | Sodium Chloride 0.9% - 10ml Syringe | Staging | |
| 1956 | 107852 | | Milrinone 400 mcg/mL - 525 mL *3 Day | Staging | |
| 1957 | 107853 | | Milrinone 400 mcg/mL - 685 mL *4 Day | Staging | |
| 1958 | 120867 | | Milrinone 400 mcg/mL - 475 mL *3 Day | Staging | |
| 1959 | 120871 | | Milrinone 400 mcg/mL - 625 mL *4 Day | Staging | |
| 1960 | 156064 | | Invanz 1gm/100mL Nacl 0.9% | Staging | |
| 1961 | 126066 | | Sodium Chloride 0.9% - 10ml Syringe | Staging | |
| 1962 | 126067 | | Heparin 100 units/mL - 5mL Syringe | Staging | |
| 1963 | 126368 | | Heparin (10 units/mL) 5 mL Syr | Staging | |
| 1964 | 123863 | | Infuvite Adult - 10 mL Kit | Staging | |
| 1965 | 123874 | | Heparin 500 units/0.5 ml Syringe | Staging | |

Tabs: Open Orders | Staging | Cleanroom | Labeling | Final Verification | Pick/Pack | Delivery | Completed Order Bottom: Orders | Dashboard | Reports | Settings ProVER — Dispensed Work Orders (2290/2290)

PHI Pharmacy Workflow (PHI_FileMaker_Test)

Eric Ho — PARAGON HEALTHCARE

PROCESS VALIDATION AND ELECTRONIC SUPERVISION SYSTEM

FIELD OF THE DISCLOSURE

The present disclosure relates generally to systems for electronically validating and monitoring multi-step processes, and more particularly, to a system for electronically validating and monitoring processes in pharmaceutical preparation.

BACKGROUND

Many processes benefit from step-by-step monitoring and validation, for a wide variety of reasons. Examples include process monitoring and validation to facilitate regulatory compliance, implement quality control, monitor inventory, and to assess employee efficacy and efficiency. One process in which monitoring and validation are particularly important is in the sterile compounding of pharmaceutical products.

Sterile compounding represents an important healthcare service provided to patients by pharmacies. Sterile compounded products play an important role in addressing infectious disease, pain management, gastrointestinal disorders, and other illnesses.

A wide array of providers including home infusion pharmacies, in-office suites, and alternate-site infusion centers provide safe and effective treatments to millions of patients every day.

Despite its critical nature, sterile compounding presents certain risks that remain a challenge for sterile compounding providers and regulators. In some cases, providers acting in violation of accepted compounding quality standards have caused death and serious injury among patients. Contaminated, defective, and sub/super-potent compounds can become life-threatening when given to even relatively healthy patients.

In light of recent events, including the New England Compounding Center disaster, in which 64 patients died and hundreds of patients were hospitalized due to a fungal meningitis outbreak linked to contaminated sterile compounds, regulators have begun to proactively adopt and enforce tighter safety and quality standards designed to prevent similar public health risks in the future.

Emerging regulatory requirements present a challenge for providers, for whom the shifting standards have forced the creation of innovative solutions that balance compliance, excellence in care, and cost effectiveness. Similarly, many providers have proactively sought to raise the industry standard of practice in order to reduce liability and better understand sterile compounding processes.

Improving the monitoring and process control in the pharmacy industry has been the subject of inventive activity. For example, U.S. Pat. No. 7,194,336 to Grant is directed to information management systems and methods that can be used with at least one pharmaceutical compounding device. The systems and methods comprise a controller coupled to the compounding device. A compounding control manager resides on the controller to receive compounding order input and generate control commands to the compounding device based, at least in part, upon the compounding order input. An order process control manager is in data communication with the compounding control manager to communicate compounding order input to the compounding control manager. The order entry process manager includes an order function for receiving entry of compounding order input through a browser-based interface. The browser-based interface can include an order entry workstation separate from the compounding device, or a network of order entry workstations separate from the compounding device, or can reside on the controller.

U.S. Pat. No. 8,554,579 to Tribble et al. appears to disclose a system for preparing and managing patient-specific dose orders includes an order processing server configured to receive the patient-specific dose orders, define a queue of dose orders and distribute the dose orders to at least one dose preparation station. The dose preparation station is in bi-directional communication with the order processing server and has an interface for providing an operator with a protocol associated with each received drug order and specifying a set of steps to fill the drug order. Steps to fill the drug order are captured at the station and a display, positionable independent of the station outputs the dose order queue and metrics concerning activity at the dose preparation station. Systems for preparing patient-specific doses and a method for telepharmacy in which data captured while following the protocol are provided to a remote site for review and approval by a pharmacist.

U.S. Pat. No. 8,756,124 to Sayers deals with a tracking system that may be used in various regulation-heavy industries, such as pharmaceutical, biomedical, construction, energy, heavy industry, and similar industries with large regulatory and/or safety considerations. The systems addresses a track-and-trace solution based on unique item-level QR codes printed on product packaging and encoding unique URLs to enable granular, item-level product management. In some embodiments of the invention, the information presented to users who access these unique URLs is tailored based on product usability information provided from authorized supply chain participants, the role of the user in the supply chain, and/or regulation required data comprising product safety data as required by regulations from a regulatory agency. Embodiments of the invention may be used for the purposes of item authentication, anti-counterfeiting measures, product recall management, and the efficient distribution of supplementary product information.

U.S. Pat. No. 6,202,923 to Boyer shows a method and an automated pharmacy system to alleviate the risk posed by a queue of printed labels for prescription vials that occurs at the printer. The method and system eliminate the need for physically transferring paperwork from one site (the imaging station) to another site (the filling station). Elimination of the physical transferring step smooths the flow of the dispensing operation, and hence, improves the throughput of the automated pharmacy, and further, helps to prevent the association of the wrong paperwork with a given prescription.

U.S. Patent Publication No. 20140214436 to Utech et al. is directed to system for component based aggregation of medication orders may include a processor and memory. The processor may receive display a queue that lists medication orders to be prepared by a healthcare professional, the medication orders indicating component medications that will be used to prepare the ordered medications. The processor may receive a selection of a first medication order listed in the queue, where the first medication order indicates a first component medication. The processor may determine a second medication order listed in the queue that indicates the first component medication. The processor may reorder the displayed queue such that the second medication order is listed adjacent to the first medication order. The processor may notify the healthcare professional of the second medication order, such as by displaying an indication of the second medication order separately from the queue.

U.S. Patent Publication No. 20120278096 to Holness appears to disclose systems, methods and devices for prescription drug authentication and more specifically a portable hand-held device and system for prescription drug authentication to be conducted ad hoc.

WIPO Publication No. WO1998050840 to King et al. shows a drug distribution system in which narcotics are tracked from the time they are delivered to the time they are administered to patients are provided in a health care facility. A locked vault having multiple compartments for accessing only through logging onto a computer software system records drugs withdrawn and by whom. The system also provides an inventory and purchase order for restocking purposes.

Although known systems provide some advantages, they fail to resolve longstanding problems of validation and monitoring. Today, even some of the most robust compliance and quality assurance programs continue to rely primarily upon paper records and inefficient manual processes. Furthermore, internal standards for process execution are usually upheld only by occasional audits and retroactive review following an incident rather than a persistent, system-driven approach designed to prevent patient harm. Paper records bear only a minimal amount of information concerning the process used to compound an order which represents an additional barrier to the development of best practices. In-process checks and in-person cleanroom communication pose a contamination risk by frequently introducing and re-introducing additional personnel to controlled sterile environments.

Accordingly, there is an established need for systems for electronically validating and monitoring processes in pharmaceutical preparation that streamline sterile compounding processes, improve patient care, and safeguard the public wellbeing by the implementation of advanced technologies in the sterile compounding setting.

It is not intended that the present disclosure is limited in its scope to the details of construction and arrangement of components set forth in the following description or illustrated in the drawings. The principles of the present disclosure are capable of other embodiments and of being practiced or carried out in various ways. Also, in describing the preferred embodiments, specific terminology will be resorted to for the sake of clarity.

SUMMARY

The present disclosure is directed to a modular, data-driven workflow system that allows verification and supervision of the compounding process through automated workflow, image capture, bar code validation, and optional override processes. These features are further supported by flexible reporting schema and indefinite storage of integrated, individual product data within the corresponding patient record. Among the advantages are: standardization of the compounding process to electronically enforce best practices across a growing network of sterile compounding pharmacies; transferable records and data reports supporting compliance with requirements mandated by regulators and the US Pharmacopeia; and analysis of collected/aggregated data concerning the compounding process for internal process improvement and to share with relevant stakeholders.

The system in accordance with the principles of the present disclosure provides an integrated platform implementing system-driven process standardization in the sterile compounding, home infusion, and alternate-site infusion pharmacy practice settings. The system employs portable electronics such as high-definition cameras, tablet computers, and/or smartphones, or other suitable devices, such as USB sensors, Bluetooth-enabled devices, or any other suitable device, along with clinical databases and desktop workstations, if desired, with each step of the compounding process to provide a comprehensive view of a pharmacy's sterile product operations in real time from the capture of an order to completion of delivery of the order. The system provides pharmacists and pharmacy technicians advanced tools to closely adhere to USP Chapter 797 and state-mandated safety and quality sterile compounding standards with the option of additional review of the process as needed or requested. The system-driven compounding process workflow produces a persistent record of each product's compounding process, which can be reviewed at any time and becomes permanently attached to a patient's record.

This workflow system is based upon a modular system design allowing for comprehensive customization intended to meet evolving industry best practices and public safety mandates. Process data captured by the system is automatically consolidated into flexible reporting schemas and data warehouses that facilitate insights for internal performance improvement review, and is easily shared with industry stakeholders.

The system features a modular workflow and compliance system providing a customizable workflow solution which enforces step-by-step compliance with quality assurance measures and compounding best practices at each stage of compounding. Workflows can be manually or automatically assigned to a product according to its risk level, therapy type, and/or compounding process at the pharmacy's discretion after an order is automatically captured by the system. Furthermore, customization, user-control and site-control features allow implementation of workflows for a broad array of purposes including training, modification for environmental concerns, and special protocols for compounding-related activities such as quality testing or hand washing. For example, users can access the platform via a unique identifier which can be assigned descriptors that may indicate that certain users are in training. These users could be automatically, or at the discretion of an administrator or supervisor, identified by the system and only be able to access highly granular, stepwise workflows that require the maximum degree of recordkeeping and oversight.

This system is compatible with Apple IOS products, Windows-based desktop workstations, and a web client accessible from any computer, mobile device, or other suitable device with an uninterrupted internet connection. The system is also designed so that it may be easily positioned as a cloud-based service delivered via a Software-as-a-Service (SaaS) model or as an add-on feature or integrated component of a third party platform, for example, a patient management software or pharmacy management system.

The system also features integrated software incorporating a wide variety of low-cost technology solutions including mobile devices, such as, for example, tablet computers and wireless internet networks without the use of capital-intensive propriety hardware or server infrastructure. The system itself can be voluntarily actuated by individual users, or can be centrally controlled to require system components to be available during a specified time period or during critical process steps. Further, the system can incorporate software that accesses hardware components, such as a camera, for example, of the mobile device automatically when critical processes are reached, or which activates the hardware components selectively through the management system software when the technician and/or pharmacist requests an operation, such as taking a snapshot, through a user interface of the system. This feature is further considered as a means to integrate temperature monitors, gravimetric devices, spectrometry devices, and other devices used in the compounding or product quality process, as needed or desired. The system is capable of incorporating advancing consumer and enterprise technology already well leveraged in other industries including manufacturing, food service, and software development. API integration allows compatibility with a wide arrangement of clinical databases, pharmacy management systems, and data warehouses. The design and infrastructure of these external integrations is likewise customizable to a provider's need.

Another feature of the system is its Video Protocol/HD Image Capture. The system's integrated software platform allows for the implementation of widely available HD image capture systems, including video recording, and video chat protocols commonly packaged with off-the-shelf technology solutions. The advancements in these areas greatly expands the flexibility and view that a pharmacist or pharmacy can command in overseeing sterile compounding operations in a cost-effective and safe manner.

The system provides management access to data insights and reporting. Through proliferation of digital touch points throughout the compounding process, the system allows for deep data collection which in turn supports highly granular quality assurance and performance reporting. These reports can then be shared both as discrete documents and as persistent data streams to an identified data warehouse. For example, as an automatically populating database can be shared between a pharmacy and an electronic exchange monitored by a regulatory body, or a report can be delivered by email or via mobile application of select metrics derived from collected data.

The system delivers superior outcomes, flexibility, and user experience in a cost-effective manner. Early generation electronic monitoring and supervisions systems have relied upon expensive proprietary hardware and server infrastructure that are both cost-prohibitive and disruptive to a provider's existing operations. Furthermore, these systems have relied upon narrow families of compatible hardware systems precluding the integration of next generation tools and technology that provide superior flexibility and capabilities. The system circumvents this barrier by providing broad compatibility with off-the-shelf technologies that require modest capital investment and minimal staff training with significant consideration for integration of other, future technologies that may benefit the user.

In addition to supporting internal best practices and promoting patient safety, the system is designed to meet compliance requirements enforceable by regulatory authorities. For example, the United States Pharmacopeia General Chapter 797 (USP 797) outlines acceptable standards for environments, quality testing, aseptic technique, and other aspects of sterile compounding. Many regulatory authorities and quality assurance organizations draw upon USP 797 as a scientific authority for their own standards concerning sterile compounding—in many cases, large sections, or the chapter as a whole, are adapted or referenced as the core of an agency's regulatory corpus. The system's capabilities allow for verification of USP 797 compliant technique and practices in a pharmacy at the product level. This includes a visual record of procedures performed, an assignment and justification for beyond use date (BUD) assignment, and verification of proper quality testing technique. Furthermore, the system provides for a process methodology that reduces the exposure of sterile products and environments to contamination by significantly reducing cleanroom/anteroom traffic. The system's modular workflow design can be further customized to enforce granular technique execution verification including surface sterilization of products introduced to the cleanroom, routine cleaning procedures, and other important USP 797 quality measures.

In the wake of recent quality failures at sterile compounding pharmacies across the United States, state agencies and regulators have risen to the occasion to better safeguard public wellbeing through stricter sterile compounding regulations and greater scrutiny of sterile compounding providers. One example of State-mandated sterile compounding regulations can be found in the Texas Administrative Code. In Texas, the Texas State Board of Pharmacy regulates sterile compounding pharmacies under the authority of the Texas Pharmacy Act and promulgated rules within the Texas Administrative Code. The recently introduced Class A-S pharmacy license applies many USP 797 requirements specifically to pharmacies in the community setting that perform sterile compounding. These new rules include a reiteration of direct pharmacist supervision requirements regarding pharmacy technicians performing delegated tasks and additional rules mandating in-process verification of sterile compounds. The system addresses both of these concerns by providing for a superior solution compared to line-of-sight supervision of controlled sterile environments through integration of video chat technology, high definition still image capture, and comprehensive process reporting. The system additionally provides for in-process check capabilities at various points of the workflow process in addition to an individualized retrospective comprehensive review.

An ongoing debate regarding the jurisdiction of federal regulators over sterile compounding has produced a divided regulatory schema that gives the Food and Drug Administration regulatory authority over 305B outsourcing facilities but not 305A sterile compounding providers. 305B outsourcing facilities perform compounding for physician office-use and other compounding not pursuant to a patient-specific prescription. 305A sterile compounding providers provide sterile compounds exclusively pursuant to a patient-specific prescription. Presently, the Centers for Medicare and Medicaid Services (CMS) functionally enforces USP 797 standards through adapted accreditation standards provided under CMS reimbursement eligibility requirements. Accreditation is generally performed by third-party accrediting agencies including the Accrediting Commission on Health Care and Joint Commission. These accrediting organizations generally enforce additional requirements regarding continuous performance improvement, stated methodologies for the investigation of product quality and patient dissatisfaction, and other quality-related policies and procedures. The system streamlines the review of process improvement in regards to sterile compounding and maximizes the utility of quality assurance resources. The system's reporting capabilities and data sharing protocols represent an evolution in the transparency of process records and associated patient records.

The system's core features represent a robust process verification and electronic supervision platform specifically geared towards serving community sterile compounding patients and providers. The system is fully scalable, requires a modest capital investment compared to existing solutions, and is completely customizable for compatibility with a broad variety of existing sterile compounding operations.

These and other objects, features, and advantages of the present disclosure will become more readily apparent from the attached drawings and the detailed description of the preferred embodiments, which follow.

BRIEF DESCRIPTION OF THE DRAWINGS

The preferred embodiments of the disclosure will hereinafter be described in conjunction with the appended drawings provided to illustrate and not to limit the disclosure, where like designations denote like elements, and in which:

FIG. 2 illustrates a screenshot at a step implemented by an exemplary system in accordance with the principles of the present disclosure;

FIG. 3 illustrates a screenshot at a step implemented by an exemplary system in accordance with the principles of the present disclosure;

FIG. 4 illustrates a screenshot at a step implemented by an exemplary system in accordance with the principles of the present disclosure;

Like reference numerals refer to like parts throughout the several views of the drawings.

DETAILED DESCRIPTION

Figure 1:
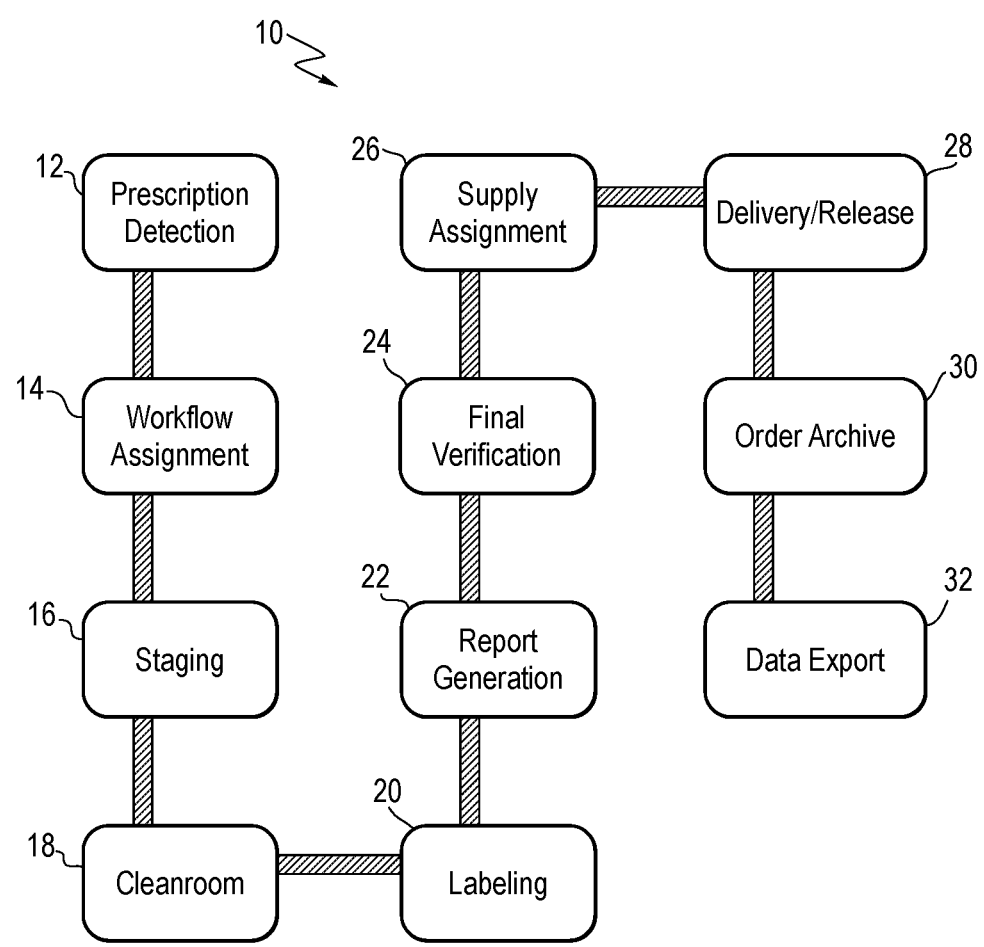
FIG. 1 illustrates a schematic flow diagram of an exemplary system in accordance with the principles of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the disclosure as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward a system for electronically validating and monitoring processes in pharmaceutical preparation that streamline sterile compounding processes, improve patient care, and safeguard the public wellbeing by the implementation of advanced technologies in the sterile compounding setting.

The system, shown generally at 10, can be implemented in accordance with the flow diagram shown in FIG. 1. At a first step 12, the system automatically detects an order ready for compounding. This detection can be accomplished by a server process routinely scanning the external database for new prescriptions/work orders and importing them into the system. Although no manual input of work orders is required, an order can also be manually entered, if desired. Work orders can be automatically derived from an external database, such as, for example, Complete Patient Record Plus (CPR+). The external database could be any suitable database, and any other software where order data can be routed through API to the system could be used in place of a standard external database. The system both looks for new orders, based on the automatic flow into the system at regular intervals, and also has an option to initiate an on demand flow of new orders from the external database into the system at any time. The system can setup different workflows for different therapies or for specific drugs, and has the option for a user to override the system workflow.

At step 14, the system assigns a product-specific workflow to the order based on its therapy type. If needed, a pharmacist or technician may manually assign a more appropriate workflow at any time. The system places the order in the order workflow queue, and displays all relevant clinical and product data, as shown in FIG. 2. The system can operate with a number of different interfaces, based on a system preference. For example, the system can operate with a desktop client interface, a web client database, an iPad client, or any other suitable interface. A unique dashboard provides information to the pharmacist. Using the dashboard, the pharmacist can see the stage that an order is in, as well as the number of orders in queue. Further, the dashboard allows pharmacists or technicians to override the workflow. In addition, a queue can be prioritized, and priority can be highlighted such as, for example, by highlighting or using colors to signify priority. A progress indicator list gives a view that includes, for example, a green bar indicating progress of an order for each order. The different exemplary tabs of the dashboard allow orders to be grouped as incomplete, by stage, or using other suitable or desirable parameters.

Step 16 illustrates the point at which the order enters the 'Staging' stage for collection of ingredients and supplies. Using a system-connected electronic device, the pharmacist or technician must provide, at a minimum, NDC validation, lot # validation, image capture, and quantity verification. An in-process check can be configured into the workflow process to allow pharmacist verification of selected ingredients prior to compounding. The technician can request a live video-protocol review with the pharmacist at any stage during the process. The technician can also request an in-process check at any stage and move the order to the pharmacist's queue for review if a live video session is not needed. The pharmacist can review an order at any stage, and then return the order to the technician's queue. A real-time interface with the external database is provided, so that if a printed copy of the order is not available the technician can see any additional instructions provided with the order on the external database.

At step 18, the order enters the 'Cleanroom' stage for processing and compounding of the final product. Pharmacist or technician must use a system-connected electronic device provide NDC validation for drugs and diluents, lot # validation, and image capture (including draw volumes). The steps within the 'Cleanroom' stage are unique to the specific workflow implemented which in turn reflects the varying techniques involved with different therapies, products, and processes. Here, the system allows for the ready documentation and capture of problems, such as a spill, for example, that can occur during the compounding process.

Figure 3:
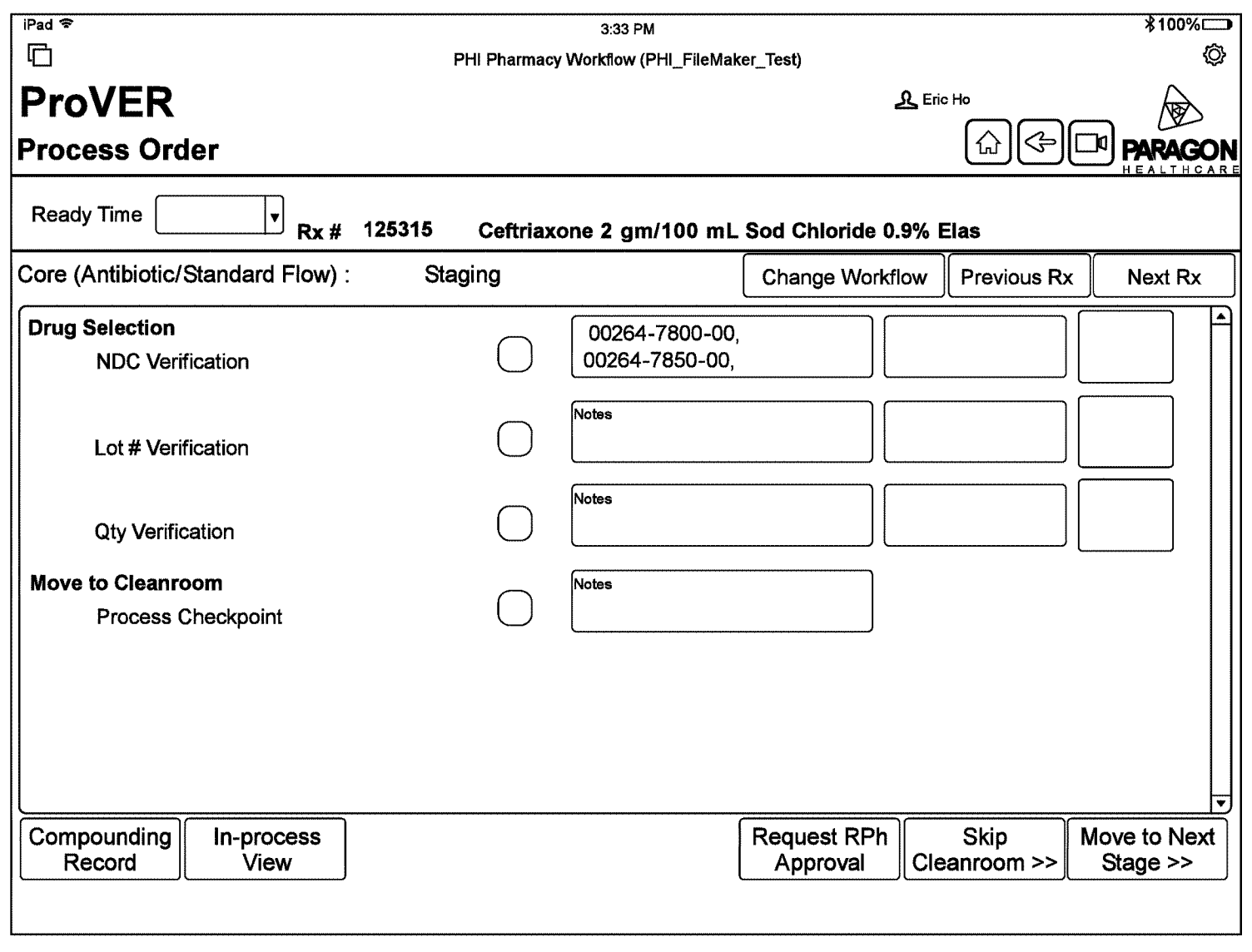

At step 18, using a touchscreen interface of a tablet computer such as an iPad or other electronic input device, the pharmacists and technicians in the cleanroom can perform quality assurance activities in an aseptic fashion. An example of the interface is shown in FIG. 3. It is to be understood that any desirable communication link, e.g., to the pharmacy, offices, and cleanroom, can be reached via video chat throughout the compounding process. Electronic devices such as tablet computers, or other suitable devices, allow a flexible view of the cleanroom and can be used to perform an in-process check or random aseptic technique audits. Furthermore, the electronic devices can be used to document incidents, such as spills within the cleanroom. Since devices such as tablet computers and smartphones are not tied down to a static area with heavy bulky hardware, users can document and note any occurrence by any of the following, for example, typing a note, using the zoom functions of a camera, removing the device from its mount and carrying/positioning it to a better vantage point and/or to engage a device function relevant to the workflow, or to employ device extensions or accessories as needed or desired, or to access any application available on a tablet or other suitable mobile device such as, for example, a smartphone or an iPad.

Figure 4:
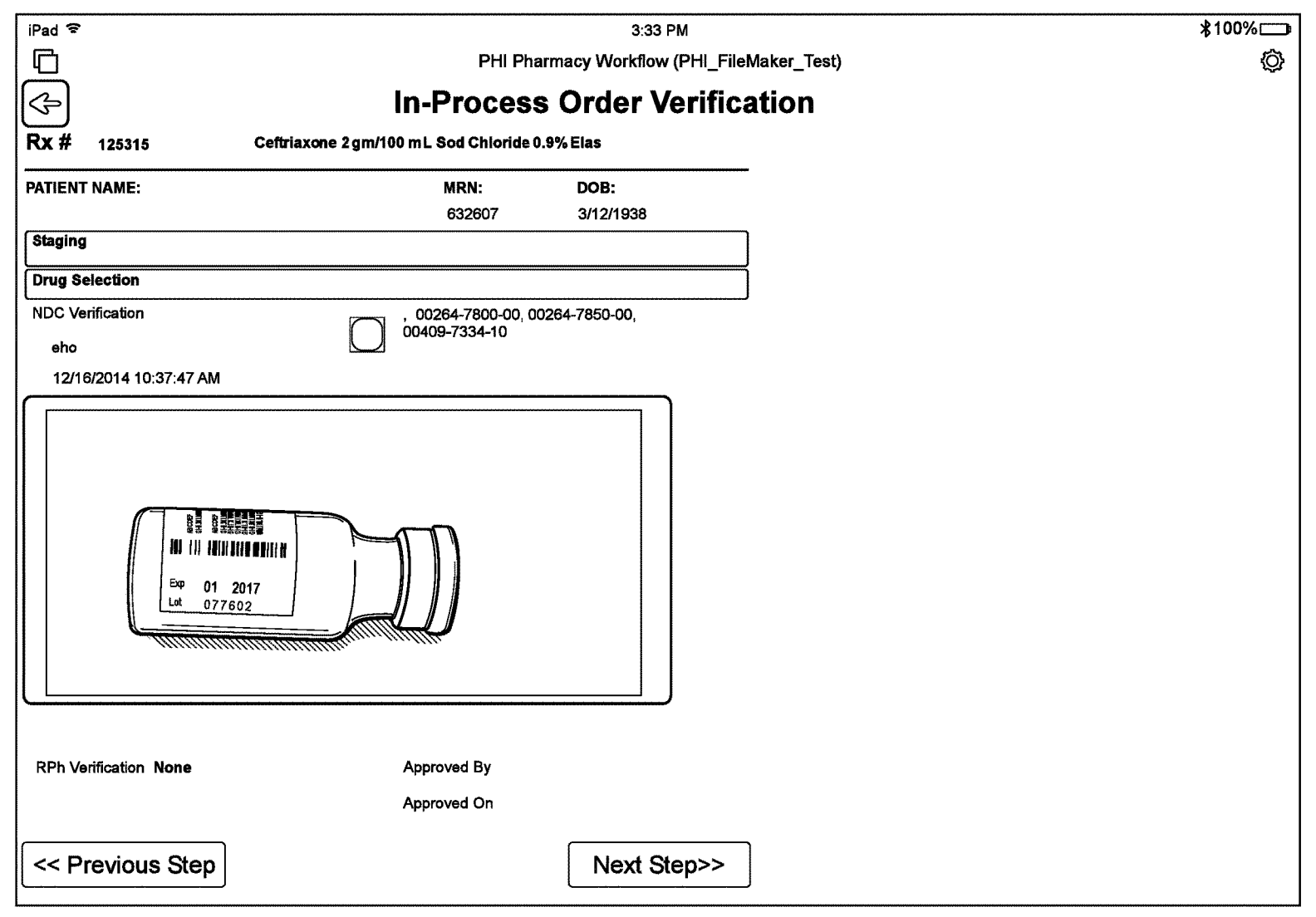

In steps 20, 22, and 24, the pharmacist receives the completed final product in the 'Labeling' 'Report Generation' and 'Final Verification' stages and reviews the comprehensive report of the compounding process including notes, order data, and failed checkpoints integrated into the system record. A comprehensive report of each step of the compounding process is recorded, collected, and displayed in a persistent report of the system that can be reviewed at any time. The system is also capable of integrating and displaying relevant information from a third party database. For example, a pharmacist who would like to confirm that the diluent to compound a product is compatible would be able to use the system to call reference information or an approved formulary loaded into the platform. Pharmacists and technicians can provide notes to better explain unexpected deviations for review. An example of a report generated by the system is shown in FIG. 4.

Next, at step 26 any supplies needed to package the order for delivery are assigned. Supplies can include, for example, boxes, labels, instructions, other orders shipping to the same recipient, or any other supplies needed to complete an order. The destination of the order is designated at step 28, where the order is released to supply assignment and delivery where it is assigned additional information concerning its delivery storage conditions, delivery time, and route of delivery, all of which are captured and integrated into the system. The order is also released for delivery at step 28, which is also integrated into the system. The system can integrate information from other connected devices, such as, for example, temperature controls contained in the delivery packaging, or other devices that can assure the time and delivery to the correct recipient under acceptable conditions. Delivery assignments, such as, for example the type of container label, box contents, tracking of actual delivery and temperature, shock or tilt conditions of the container, and also the recipient, and date and time received can be collected via the system and integrated into the patient record. Further, if a patient or recipient calls for the status of a delivery of an order a significant amount of time can be lost in the effort to obtain status update information regarding the order from paper records or telephonically from a third party parcel carrier. With the system of the present disclosure, the order is located efficiently in the system, and a delivery update is readily accessible, increasing the efficiency of the overall operation of the pharmacy.

As shown at step 30, completed orders are archived within the system's reporting database and attached to the patient's chart. The completed order includes a pdf of all verification data that can be exported to the external database and attached to a patient chart.

At step 32, process data can further be exported via a variety of formats into third party data warehouses or rendered as customized reports to be shared with internal and external stakeholders. The system has the ability to both capture images of the record and save as part of record and allow for personal, real-time guidance throughout the process. This facilitates evaluation of individual performance metrics for the individual users of the system, and can also use as a training tool.

The system 10 is designed to address several deficiencies in the current standard of practice. Today, even some of the most robust compliance and quality assurance programs continue to rely primarily upon paper records and inefficient manual processes.

Furthermore, internal standards for process execution are usually upheld only by occasional audits and retroactive review following an incident rather than a persistent, system-driven approach designed to prevent patient harm. Paper records bearing only a minimal amount of information concerning the process used to compound an order represents an additional barrier to the development of best practices. In-process checks and in-person cleanroom communication also pose a contamination risk by introducing and re-introducing additional personnel to the controlled sterile environments.

There are many ways in which the system 10 addresses some of the major deficiencies in the current standard of practice. For example, known compounding approaches are subject to a significant margin of human error, particularly with respect to drug selection. Sound-alike and look-alike medications remain a risk when NDCs are not verified. With the system of the present disclosure, NDC and lot number validation against order data prevents mismatches. HD image and video capture allows review of all selected products.

In another example, known compounding approaches present significant barriers to supervision of the workflow. A workstation/desktop computer is usually a pharmacist's primary duty station from where a pharmacist is able to see, usually from a distance, the general activities in a cleanroom. Line-of-sight supervision remains the current standard, but is suboptimal for cleanroom supervision as most techniques require close inspection or proximity to ensure compliance. Consequently, prevailing supervision methods are an additional source of distraction and interruption and therefore error.

With the system of the present disclosure, HD image and video capture allows review of compounding processes directly from the workstation. Video chat protocol allows for communication and supervision of compounding processes from the pharmacist's workstation with minimal distraction and interruption. Thus, the system facilitates remote in-process approval that enables a process to stop before a technician proceeds to the cleanroom. Furthermore, a second in-process step within the cleanroom allows a check before the compounding process is completed for a specific dose or batch of doses. All in-process checks can be mandated based on workflow or workflow step, voluntarily requested by the technician or pharmacist, or randomly prompt by the system per assigned protocol. Prescription orders under review in an in-process check are blocked from advancing further down the workflow until a pharmacist indicates approval. Pharmacists are notified of pending in-process approvals via a separate queue notification from the system dashboard. Voice and video integration further allows a pharmacist or technician to reach off-site personnel with specialized expertise or receive approval from supervisors for business-relevant issues encountered during the compounding process.

In another example, known approaches provide at best a variable adherence to standards. Charts audits and spot process audits only present a 'snapshot' of a single point of operations. Variability in performance and processing presents a quality assurance risk. With the system of the present disclosure, system-driven workflow tasks require step-by-step compliance with best practices at all times. Granular reporting data allows for review of compounding process adherence over any requested timeframe at the individual, facility, and company level.

Known approaches also present a heightened contamination risk. Increased traffic due to in-process checks and in-person communications represent an additional risk for contamination, and increased traffic to and from pharmacist workstations represent an additional risk for human error. With the system of the present disclosure, HD imaging and video capture systems significantly reduce cleanroom traffic, cleanroom crowding, and workflow interruptions throughout the day.

In known approaches, pen and paper records are limited in their ability to describe actual process execution. Pen and paper records are suboptimal for proactive error detection and process improvement. Data from pen and paper records are difficult to aggregate and trend. With the system of the present disclosure, comprehensive granular reporting produced by digital touchpoints throughout the compounding process allows for previously unavailable insights into the compounding process.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalents.

What is claimed is:

1. A system for automating a compounding process selection based on the content of a prescription order received by the system and remote safe-guarding workflow in a pharmacy comprising:
   a management system connectable to an external database;
   at least one mobile device having image capture capabilities selectively connected to the management system and the at least one mobile device selectively disposed inside a pharmacy compounding facility including a clean room;
   the management system receiving video chat data, images and records from the at least one mobile device and sensor input from a sensor array to form a storable quality assurance record for at least one workflow, the workflow automatically determined and selected by the system based on validation requirements of a prescription received and detected;
   the management system configured to initiate and store selective remote requests including at least one of entry of override information, selective connection of process review requests, and selective initiation of an in process approval signal generated in response to a pharmacist device located outside the clean room, the pharmacist device configured to enable selection of a signal for at least one of confirming or modifying the workflow automatically selected by the system, wherein any selective requests generated from the pharmacist device are transmitted to and received by the system, and generate one or more updates in the system that selectively modify the selected workflow, and store the one or more updates in the storable record for the workflow.

2. The system of claim 1, wherein the storable record attaches to a patient record via an output generated by the system.

3. The system of claim 1, wherein the system stores and analyzes remote requests and the storable record for internal system performance review.

4. The system of claim 1, wherein the workflow is assigned according to risk level.

5. The system of claim 1, wherein the workflow is assigned according to therapy type.

6. The system of claim 1, wherein the workflow is assigned according to available compounding processes.

7. The system of claim 1 configured for central control during specified time periods.

8. The system of claim 1, wherein the workflow can incorporate an automatic stop before the at least one mobile device enters the clean room to facilitate transmittal of remote requests based on a unique descriptor input to the system for the technician assigned to the workflow.

9. The system of claim 1, wherein the pharmacist device can facilitate real-time remote oversight of the workflow selected by the system remotely from the clean room and initiate or respond to requests that are generated by the system or via the pharmacist device and transmitted to the system to form updates to a portion of the storable record for the workflow.

10. The system of claim 1, further comprising digital touchpoints.

11. The system of claim 1, wherein the storable record contains workflow decision information, both automated and manual, captured throughout the workflow process from the prescription order capture and workflow determination to delivery of the prescription.

12. An automated compounding pharmacy system comprising:
   a sensor array including one or more temperature monitors, gravimetric devices, and spectrometry devices configured to maintain quality requirements during a compounding process; and
   a video chat system configured to facilitate automated processing of a workflow using real-time pharmacist oversight via a remote device operatively connected to the system and located outside a clean room during compounding processing of workflows in the clean room;
   the system further comprising a mobile device connected to the video chat system and located inside a clean room used to automatically facilitate modifications of workflows and automated processing based on a skill and training level of technicians in the clean room.

13. A method of operating an automated system to reduce contamination risk in a compounding pharmacy comprising the steps of:
   providing a system configured to sync to a pharmacist device for communication and oversight of prescription product compounding workflows remotely and in real-time, the pharmacist device locatable outside of a clean room in a pharmacy and configured to enable video chat capabilities with a technician mobile device in the clean room via the system for each workflow and to initiate optional override processes via the system for a workflow in real-time, the system further configured to automatically adjust oversight required for a workflow based on a skill level of the technician for a selected workflow; and the system further comprising quality sensing devices for automating delivery of a compounded prescription product of the workflow while retaining quality of the compounded prescription product of the workflow.

* * * * *